US010830626B2

(12) United States Patent
Pechuk et al.

(10) Patent No.: US 10,830,626 B2
(45) Date of Patent: Nov. 10, 2020

(54) CONTAINER FILLING OR EMPTYING GUIDANCE DEVICE

(71) Applicants: Nir Pechuk, Sammamish, WA (US); Ron Pechuk, Sammamish, WA (US); Maxwell A. Mamishev, Seattle, WA (US)

(72) Inventors: Nir Pechuk, Sammamish, WA (US); Ron Pechuk, Sammamish, WA (US); Maxwell A. Mamishev, Seattle, WA (US)

(*) Notice: Subject to any disclaimer, the term of this patent is extended or adjusted under 35 U.S.C. 154(b) by 0 days.

(21) Appl. No.: 16/355,848

(22) Filed: Mar. 18, 2019

(65) Prior Publication Data

US 2020/0072650 A1    Mar. 5, 2020

(51) Int. Cl.
| | | |
|---|---|---|
| G01F 23/00 | (2006.01) | |
| G08B 21/18 | (2006.01) | |
| G08B 6/00 | (2006.01) | |
| G08B 3/10 | (2006.01) | |
| G08B 5/36 | (2006.01) | |
| G05D 9/00 | (2006.01) | |
| G01F 23/296 | (2006.01) | |

(52) U.S. Cl.
CPC ....... *G01F 23/0076* (2013.01); *G08B 21/182* (2013.01); *G08B 3/10* (2013.01); *G08B 5/36* (2013.01); *G08B 6/00* (2013.01)

(58) Field of Classification Search
CPC ........... A47G 19/2227; A47G 19/2244; G01F 23/0069; G01F 23/0076; G01F 23/2962; G05B 15/02; G08B 3/10; G08B 5/36; G08B 6/00; G08B 21/182; G08B 21/24; G08B 21/245

USPC ......................................................... 340/526
See application file for complete search history.

(56) References Cited

U.S. PATENT DOCUMENTS

| | | | | |
|---|---|---|---|---|
| 2,309,851 | A * | 2/1943 | Kuhne | A47J 47/20 211/85.25 |
| 3,781,840 | A * | 12/1973 | Roberts | G01F 23/241 340/620 |
| 3,947,901 | A * | 4/1976 | Willett | E03D 9/032 4/231 |
| 4,547,768 | A * | 10/1985 | Kulhavy | E03D 1/00 340/530 |
| 4,733,381 | A * | 3/1988 | Farmer | B67D 1/1238 141/198 |
| 4,917,155 | A * | 4/1990 | Koblasz | B67D 1/1238 141/1 |
| 6,008,728 | A * | 12/1999 | Wesey | G01F 23/60 200/61.01 |

(Continued)

*Primary Examiner* — Stephen R Burgdorf
(74) *Attorney, Agent, or Firm* — Krystyna Szul

(57) ABSTRACT

A substance contactless device configured to detect, monitor, and alert a user about the changing level of the substance filling a container. The substance can be any substance, including fluids, for example hot water, or solids, for example grain or beans. The device includes sensors, for example an ultrasonic, an infrared, a piezo, or a pressure sensor to detect the changing level values with respect to a predetermined threshold level value. The sensor can scan the container to determine and preset a fill level, from the top of the container. The device can also include a pressure sensor, sensing when a substance is being added or removed from a container. The sensor can also be a piezo sensor. Using a one or more sensors, such device does not need to come into a physical contact with the substance being filled or emptied.

7 Claims, 5 Drawing Sheets

(56) References Cited

U.S. PATENT DOCUMENTS

| | | | | | |
|---|---|---|---|---|---|
| 6,023,970 | A * | 2/2000 | Blaine | | G01F 23/284 73/290 R |
| 6,513,172 | B1 * | 2/2003 | Norton | | A47K 13/24 4/300.3 |
| 6,956,486 | B2 * | 10/2005 | King, Jr. | | E03C 1/24 340/618 |
| 8,136,690 | B2 * | 3/2012 | Fang | | A47G 19/2227 220/600 |
| 9,138,091 | B2 * | 9/2015 | Zhao | | G01F 23/0076 |
| 9,930,980 | B2 * | 4/2018 | Pau | | A47G 19/2288 |
| 10,278,525 | B2 * | 5/2019 | Knoblauch | | A47G 19/2272 |
| 10,385,555 | B2 * | 8/2019 | Braddock | | E03C 1/055 |
| 2001/0040126 | A1 * | 11/2001 | Chilibeck | | B01D 21/0012 210/198.1 |
| 2002/0121982 | A1 * | 9/2002 | Ferris | | G01F 23/0015 340/612 |
| 2005/0242966 | A1 * | 11/2005 | Picco | | G01F 23/243 340/616 |
| 2006/0168716 | A1 * | 8/2006 | Schuster | | E03D 1/32 4/415 |
| 2009/0288483 | A1 * | 11/2009 | Varga | | G01F 23/303 73/292 |
| 2009/0303059 | A1 * | 12/2009 | Von Lintzgy | | G01F 23/0076 340/621 |
| 2011/0050431 | A1 * | 3/2011 | Hood | | G01N 33/14 340/603 |
| 2016/0286993 | A1 * | 10/2016 | Pau | | A47G 23/16 |
| 2017/0183852 | A1 * | 6/2017 | Guthrie | | F16K 31/34 |
| 2018/0135285 | A1 * | 5/2018 | Canfield | | E03D 5/026 |
| 2018/0330315 | A1 * | 11/2018 | Gurumohan | | H04W 76/14 |

\* cited by examiner

CONTAINER FILLING OR EMPTYING GUIDANCE DEVICE

FIELD

The present invention is in the technical field of appliances. Particularly, the present invention is a guiding device for controlled filling of a container with a substance to avoid spills.

BACKGROUND

To-date attempts have not addressed the problem of easy, reliable, accurate, low or maintenance free of filling and emptying of a container. Existing devices are somewhat cumbersome, costly, and need to come in contact with the substance, requiring maintenance by having to clean them up thereafter. Further, a device that needs to come into contact with the substance may be subject to accelerated wear and tear. A small, inexpensive, reliable guiding device that does not need to come into physical contact with a substance is highly desirable, especially for a vision impaired or blind person, but also when a person is learning or re-learning how to fill or empty a cup, for example. Such a device can also be very useful for people who multitask in busy private or restaurant kitchens, for example, when managing several tasks with some containers filled with substances that can boil over and potentially compromise the quality of food being prepared. The present disclosure addresses this need and offers such a guiding device that can accurately assist a user to fill or empty a container, prevent spillage, unnecessary cleanups and even potential injuries.

SUMMARY

The present disclosure comprises a device that can detect, monitor, guide, and/or alert a user to prevent spills in filling or emptying a container as the level of the substance is changing within a container.

In one embodiment, a device detects and monitors the changing level of a substance in a container and emits feedback as the level is changing. The substance can be any substance, including fluids, for example hot water, or solids, for example grain or beans. The device includes one or more sensors, for example an ultrasonic, an infrared, a piezo, or a pressure sensor to detect the changing level values with respect to a reference of a predetermined threshold level value. The infrared sensor, for example, can scan the container to determine and preset the threshold level, which is the fill line level, from the top of the container. Further, the device can also include a pressure sensor, sensing when a substance is being added or removed from a container. The sensor can also be a piezo sensor. Other types of sensors are possible. Using a one or more sensors, such device does not need to come into a physical contact with the substance being filled or emptied.

In one embodiment, the device can have one or more memory settings for a one or more threshold levels in a container. In one aspect, the device does not come in contact with the substance filling the container because the proximity sensor alerts when a certain distance is reached from the device to the substance. The distance can be predetermined and different configurations can be preset on the device. For example, one could wish to on fill the container half way at one time, and at another time the container could be filled only a quarter of the way, while yet at another time, the container can be filled to the highest level.

One aspect of the present disclosure is a device and method of determining, monitoring, and alerting according to changing substance levels in a container which facilitates more accurate and efficient tracking of disbursement as well as filling of the container without the need for the device to come in contact with the substance itself. An additional feature can include voice messaging, which can have standard language such as: Start, Slower, Too Fast, Half, Stop, and Empty, Full. Alternatively, customized, or customer programmable, messages can be provided. There could be simple alerts or customizable melodies or sounds. There can also be a temperature gauge and reader, alerting the user that contents have a particular temperature and caution if they are too hot to drink, for example. The device can also help determine if a spillage occurs similar substance is detected within a narrow radius of the outside of the container and can caution a user.

Other aspects, advantages, and features of the present disclosure will become apparent after review of the entire application, including: Brief Description of the Figures Detailed Description, and the Claims.

Program listing is one example in accordance with some embodiments.

DETAILED DESCRIPTION

Disclosed here is a guidance device for filling or emptying a container to a desirable threshold level, as shown in FIGS. 1-5.

One aspect of the present disclosure is a method of determining, monitoring and alerting according to changing substance levels in a container, which facilitates more accurate and efficient tracking of disbursement, as well as filling of a container. The device, as exemplified in FIGS. 1-5, detects and monitors the changing level of a substance in a container and emits feedback alert when change in level, or gradient of a substance entering or exiting the container is detected. The substance can be a wide range of substances, fluids or solids. To detect a change, the device includes one or more sensors, for example an ultrasonic, an infrared, a time of flight laser, a piezo, or a pressure sensor to detect the changing level values with respect to a reference of a predetermined threshold level value. The infrared sensor, for example, can scan the container to determine and preset the threshold level, which is the fill line level, from the top of the container. Further, the device can include a pressure sensor, sensing when a substance is being added or removed from a container. The sensor can also be a piezo sensor. In one embodiment, the device includes an ultrasonic sensor connected to a central processing unit or a microcontroller. The device can also include an ultrasonic distance sensor connected to a central processing unit or a microcontroller. When the sensor detects a substance approaching a predetermined fill line, or threshold level, a beeping feedback is emitted. The beeping can further be of one intensity, or can increase or decrease in intensity if the fill line is surpassed or the container is being emptied. Other types of sensors are possible. Other types of sensors are possible.

Figure 1:
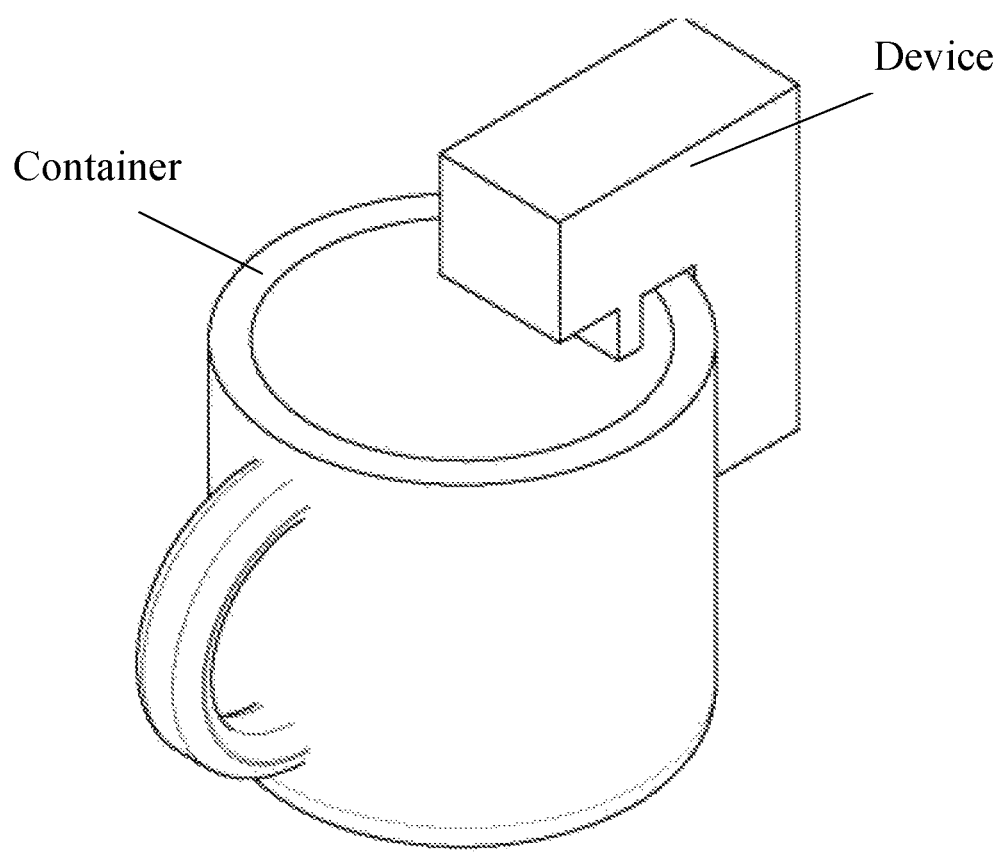
FIG. 1 is a perspective view (3D) of a substance level control device in accordance with an embodiment of the present invention.

The guidance device as shown in FIG. 1 is removably attached to a container or a vessel, such as a cup in this particular embodiment. The device can be attached to the rim of a container, with a first part a extending parallel to the base of the cup and towards the center of the cup and a second part extending parallel to and along the wall of the cup, resembling an "L" shape. Other configurations are possible. In one embodiment, the first and the second part of the device are connected at the rim of the cup. The attachment connection can be adjustable depending on the container's, or the cup's, dimensions and shape. Both the first and the second part are situated on the outside structure of the container. Other types of attaching the device are possible. In one embodiment, the device can have one or more memory settings for a one or more containers. Additional benefit includes portability and configuration that can work with a wide variety of containers or cups. The device can be inexpensive, and very effective, as well as accurate and reliable. The cup can assist visually impaired persons and prevent unnecessary spills or even injuries.

Figure 2:
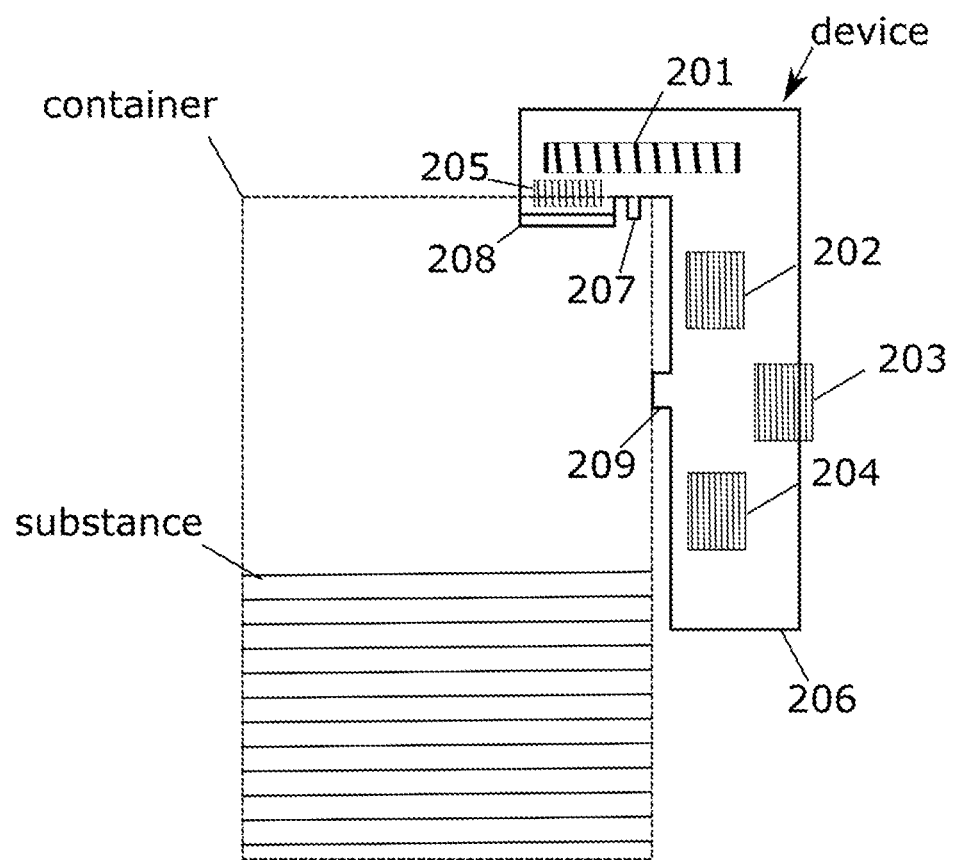
FIG. 2 is a side view of the substance level control device of FIG. 1 in accordance with an embodiment of the present invention.

FIG. 2 also shows the device placed on a container. The device comprises of an external shell 206 in which the following components are installed. A central processing unit 202, a battery 201, a proximity sensor 205, an alert feedback module 204, a shell 206, a holder 207, a stabilizer 209, a waterproof lid 208, and an on/off switch 203. The holder 207 and the stabilizer 209 firmly holds the shell 206 in place while a user is pouring water. Alert feedback module 204 may include a piezo electric buzzer or a light emitting diode, for example.

An additional feature can include an alert feedback module 204, such as voice messaging, which can have standard language such as: Start, Slower, Too Fast, Half, Stop, and Empty, Full. Alternatively, customized messages can be provided. There could be simple alerts, or customizable melodies or sounds.

There can also be a temperature gauge and reader (not shown), alerting the user that contents have a particular temperature and caution if they are too hot to drink, for example.

Using one of the sensors, the device can also help determine if a spillage occurs similar substance is detected within a narrow radius of the outside of the container and can caution a user.

The alert feedback module 204 can include one type of alert, or can include a variety of alerts, types and intensity. For example, on one setting, an alert can include a combination of audible, tactile, and visual alerts. In another setting, the device can be switched to an inconspicuous mode, and alerting via touch only without additional visual or auditory alarms. Alternatively, or in addition, the feedback can be sent to a remote mobile device and appear in the form of a text or via separate interface or app. The emitting alert can be also sent to a remote mobile device and/or household device such as a smart speaker device, or a smart wearable device.

A one or more sensors can include a transducer configured to determine the rate at which a container is being filled and emits an alert if the rate is not adequate after a preset period of time. The sensor can include a transducer configured to determine the rate at which a container is being filled or emptied and the feedback module can emit an alert if the rate is exceeding a predetermined safe flow rate, for example. The feedback module can then provide alerts such as change in the rate of beeping, or different type of beeps, or intensity, or voice alert such as "slow down" or "too fast" can be emitted.

Figure 3:
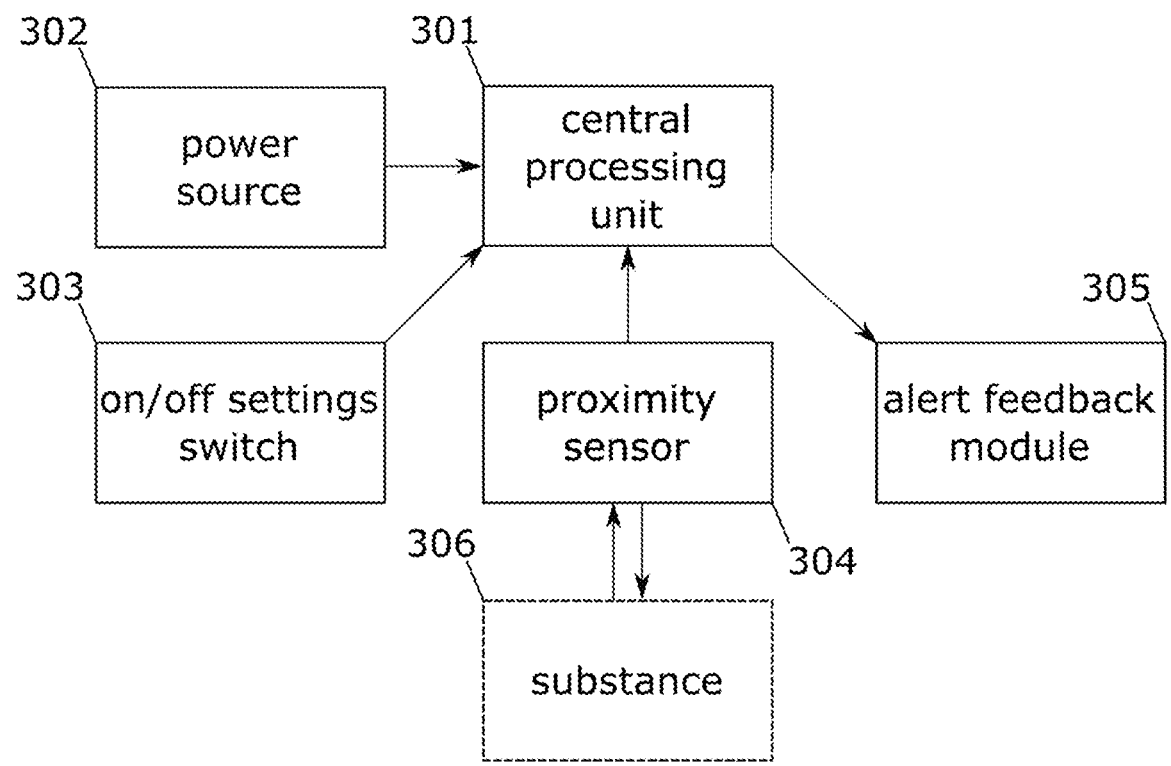
FIG. 3 is block diagram of the device and methods in accordance with an embodiment of the present invention.

As shown in FIG. 3, the device has a power source 302, such as a battery, for example and further houses, a central processing unit 301, or a microcontroller, a power on/off switch 303, at least one type of sensor, for example a proximity sensor 304, and an alerting feedback module 305. Each sensor of the guidance device is connected to the central processing unit 301, which when activated by the power switch 303, controls the sensor and the alert feedback module. When the sensor's transducer detects that a predetermined and preset conditions are met, the alert feedback module 305 indicates when and emits at least one feedback alert and notify a user that a fill line or a predetermined threshold level is about to be reached, is reached, or has been surpassed.

Figure 4:
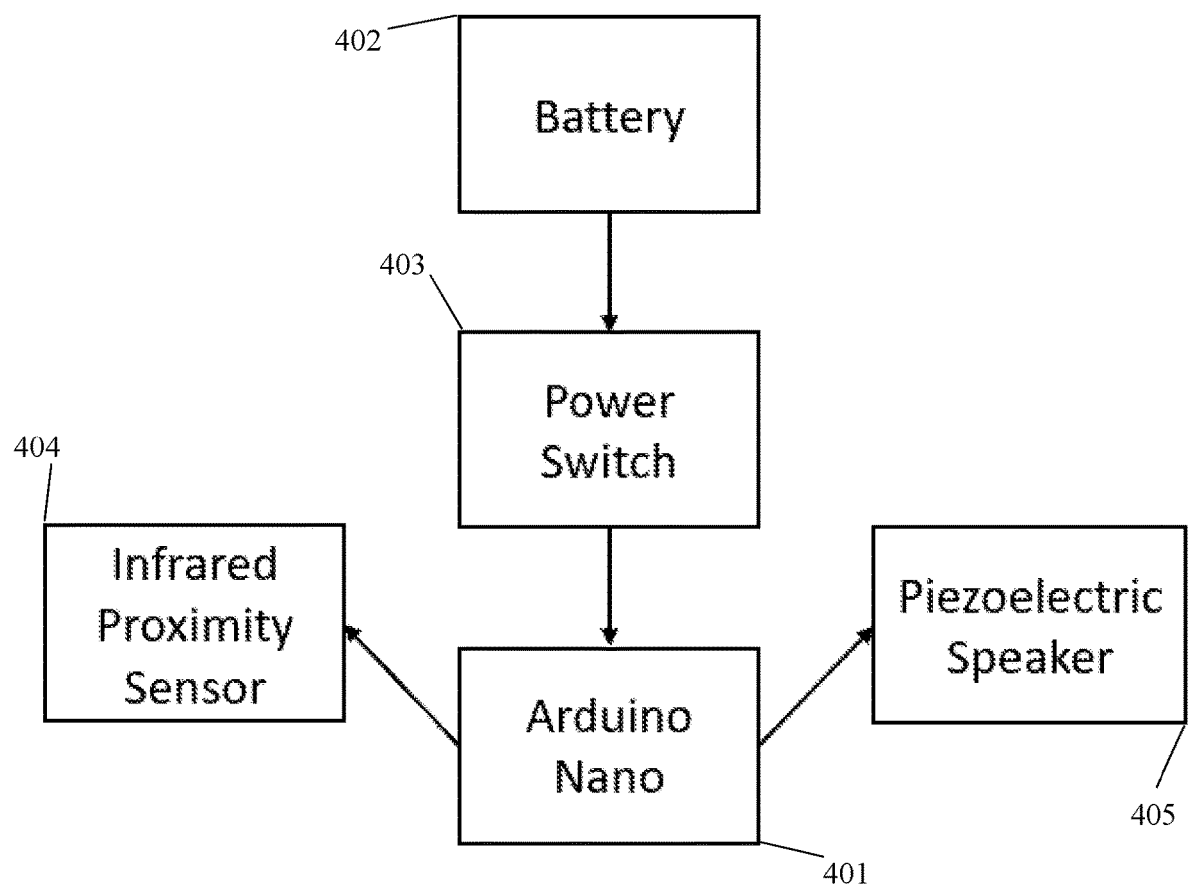
FIG. 4 is an example embodiment of FIG. 3

FIG. 4 is a further embodiment of FIG. 3, where a battery 402 activates the power switch 403, which then triggers a microcontroller, such as for example Arduino Nano 401, which controls the Infrared proximity sensor 404 and the alert module, such as a piezoelectric speaker 405.

In one embodiment, as shown in FIGS. 2 and 4, the device is powered by batteries, such as a 9 volt battery pack, and housed in a case 206, also referred to as housing or shell, as shown in FIGS. 1, 2, and 4. The device attaches removably, or can hang on the rim of a cup, as shown in FIGS. 1 and 2. The device has a holder 207 and a stabilizer 209, which help to secure the device about the container. As shown in FIG. 2, the proximity sensor can detect and alert about the substance rising or lowering in the container. The power source can be a wired electrical outlet, solar, or wireless power such as ambient backscatter or ultrasound, or a combination of power sources.

An example method includes attaching a guidance device for filling or emptying of a container with a substance to a desirable level onto a container, activating a power switch and activating the guidance device, and once the powered switch is activated, determining and activating threshold settings for filling or emptying of the container. The method further offers configuration to adjust alert intensity and types of alerts and emitting feedback alert when the at least one sensor detects the fill level within a predetermined margin of the threshold setting.

At least one sensor is engaged when a filling or emptying of the container begins and the feedback module is activated. If filling or emptying of the container does not begin, an alert is issued and within a preset period of time from that alert, the device automatically turns itself off In one particular embodiment, the 3D housing of the device, also referred to as a shell or case 206, is shaped like an upside-down 'L'. There is and access point for the sensor to fit through at the top and a lid that is also in an upside-down 'L' shape to cover up all the electronics. The lid has a hole where power on/off switch sticks out. The main body also has two nubs: the holder sticking out of the top and the stabilizer sticking out of the side that allow the device to firmly hang on the side of the cup FIGS. 1 and 2. On the top part of the device (short side of the "L") there are two parts sticking up to snugly fit a battery.

Figure 5:
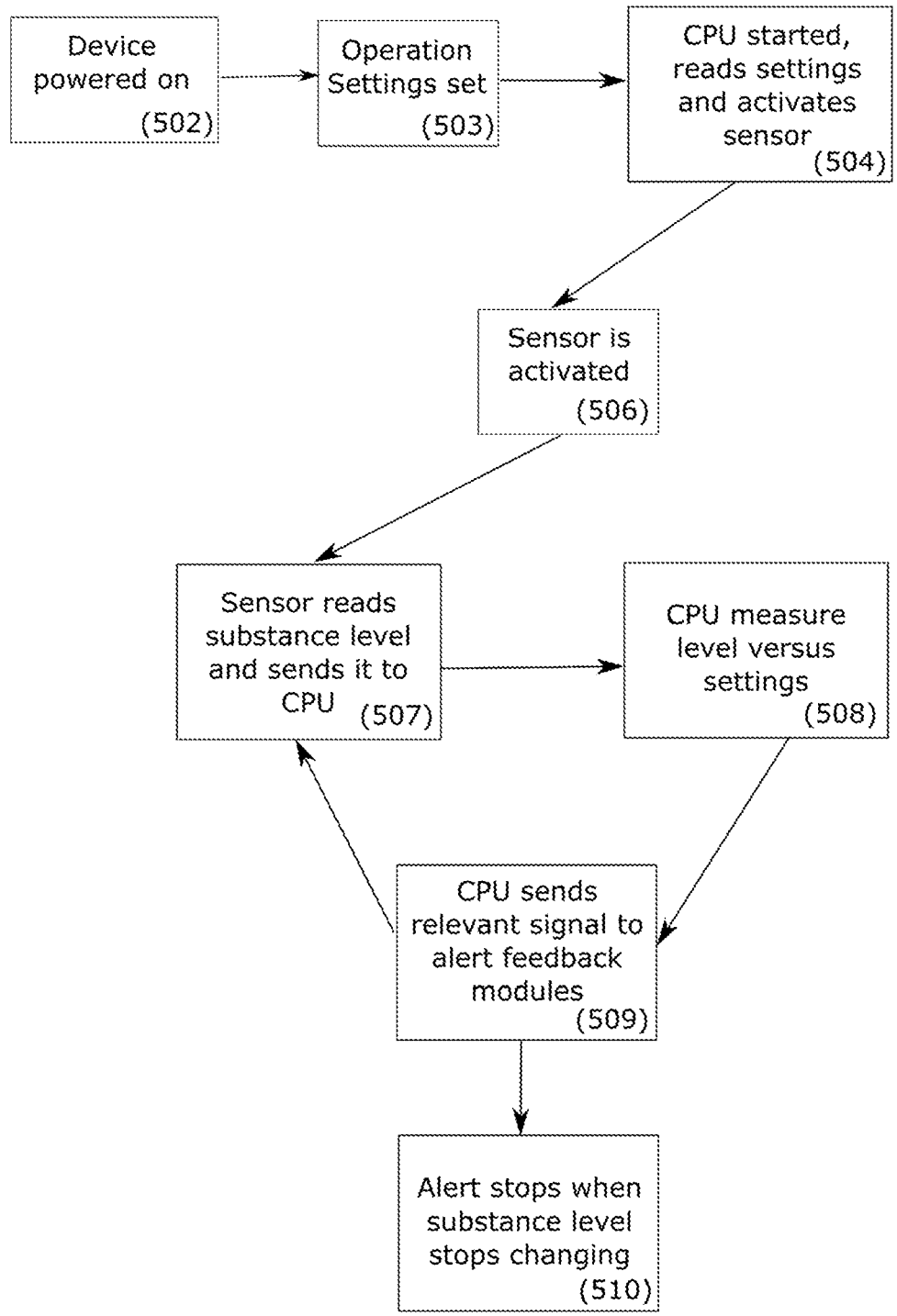
FIG. 5 is a flowchart of a method for controlled filling or emptying of a container with a substance, in accordance to one embodiment of the present invention.

In a particular embodiment, as shown in FIG. 5, the device is powered on (502) and an operations settings and interface are (503), the central processing unit (CPU) is activated (504), reads settings and activates at least one sensor. A sensor is activated (506) and reads level of the material or substance (507), and sends it to the CPU. The CPU measures the level against the settings (508) and sends the relevant signal to the feedback module (509). Alert stops when the level of the substance stops changing (510).

In one particular embodiment, the device comprises HC-SR04 ultrasonic distance sensor. The ultrasonic sensor sends out a high frequency sound pulse (40 kHz) and determines the time the sound reflects from the substance. The sensor has two mounts in which one transmits ultrasonic waves while the other receives them. The ultrasonic sensor consumes 20 mA when sensing, which Arduino Nano can easily provide, and when not sensing the sensor consumes 2 to 3 mA.

In one example, Arduino Nano is used because it is a small and breadboard friendly version of the Arduino UNO platform. It is based on the same ATmega328p as the Arduino UNO. The Nano can provide up to 40 mA of current to any component connected to it. A Piezo Buzzer works well with Arduino Nano. The Arduino Nano is powered by the 9v battery which is connected to the Vin and GND pins. Arduino has a voltage regulator on board to bring the voltage down to 5V. In one example, the working voltage of the board is 5V. The HC-SR04 distance sensor is connected to pins A2, A3, A4, A5 of the Arduino Nano. Pin A5 provides Vcc to the sensor, this is achieved by holding the pin A5 at high (5V) all the time. Pin A2 provides Gnd to the sensor, this is achieved by holding the A2 at low (0V) all the time. The pin A4 of the Arduino is connected to the Trigger pin of the sensor. The pin A3 of the Arduino is connected to the Echo pin of the sensor. The Piezo buzzer is connected to the pins D3 and D6 of the Arduino Nano. Pin D3 provides Gnd to the sensor, this is achieved by holding the D3 at low (0V) all the time. Pin D6 provides the signal. Turning the pin to high (5V) causes the buzzer to make a sound. The device program is written in Arduino, which is in turn C. The device senses the level of the substance and it starts beeping when it's 45 mm away from the sensor in the container. The HC-SR04 ultrasonic sensor is used. The controller sends a high signal of 5V to activate the trigger pin, and hold it at high for 12 microseconds. This causes the sensor to send out a sound pulse. Then, the sensor waits for the echo to come back, and pulls the echo pin high as soon as the echo is detected. The microcontroller measures the time for the echo pin to turn high and uses it to calculate the distance. The formula it uses to evaluate the distance from the sensor to the substance is: distance(m)=time(s)×speed of sound (343 m/s, or 34300 cm/s). For every cm of distance, time=1 cm/34300 cm/s=29 microseconds. Since the sound has to go to the substance and back, the distance travelled will be twice the real distance. For every 58 (29×2) microseconds, we know the water level is 1 cm away. So, distance is the time taken (in microseconds)/58. Then, the microcontroller compares to the desired distance. If the measured distance is less than the desired distance, we turn the buzzer on for a short duration. If not, the device waits for some time for the echoes to settle down.

The entire process described above is repeated in a loop infinitely, if the device is on. This results in the buzzer beeping whenever the substance level is closer than the target distance, and being quiet when it is further. Then, if the distance is less than 45 mm, the buzzer starts beeping. If the distance is more than 45 mm, it repeats the program until the substance level is within 45 mm.

An example program is listed in Program Listing 1.

This application uses many concrete details to make the description unambiguous. However, the details are for expository purposes, and the invention still applies to alternate ways of achieving the same result, using the methods described in the patent.

Details that can be changed include, but are not limited to the following:

The microprocessor used for this application was Arduino, but alternate microprocessors can be used. For example, AtTiny85 from ATMEL provides a cheap and compact alternative to the Arduino Nano. Other microprocessors can be used.

The housing design is functional for the purpose described, but alternate designs can be used to achieve the same objective.

The sensor can be HC-SR04, but any ultrasonic distance sensor can be used instead.

The device can comprise a piezo buzzer, but alternate alerting devices, sensors, feedback devices are possible, and indeed desirable in different situations.

For users who are blind and deaf, a vibrating buzzer can be used instead of an auditory output. There are a number of compact devices available that can create a small vibration, in a compact form factor.

A more compact buzzer can be used instead of the piezo buzzer used in the application.

A visual feedback can be incorporated, for example a bright light source can be used for users that are partially blind.

This application recites a 45 mm as the distance at which to beep, that is fill or threshold level. Different distances can be used based on user preferences. A potentiometer can be added to make the desired distance configurable by the user.

We claim:

1. A guidance device for filling or emptying a cup to a desirable threshold level, the device comprising:
   a housing configured to be removably attachable to a rim of the cup and with at least some part of the housing remaining on the outside of the cup;
   a central processing unit;
   a power switch;
   a stabilizer:
   an infrared sensor; and
   a feedback module;
   wherein the housing comprises the central processing unit, the power switch, the stabilizer, the infrared sensor, and the feedback module;
   wherein the central processing unit is configured to be activated by the power switch and to control the infrared sensor and the feedback module;
   wherein the feedback module, based on the infrared sensor's detection of a predetermined threshold level of a substance within the cup, is configured to emit at least one feedback to notify a user that the predetermined threshold level of the substance within the cup, without the substance coming into a physical contact with any part of the guidance device, is about to be reached, has been reached, or has been surpassed;
   wherein the at least one feedback varies in intensity as the predetermined threshold level is approached, reached, and surpassed; and
   wherein the stabilizer is configured to removably affix the guidance device to the cup and to hold the device firmly and immovably in place when attached to the cup; and further wherein the guidance device is configured to provide the at least one feedback without having to come into contact with the substance.

2. The device of claim 1 wherein the power switch is connected to a power source comprising a battery, an electrical outlet, solar, or a combination of power sources.

3. The device of claim 1 wherein the sensor comprises a transducer configured to determine a distance between a changing substance level and the predetermined threshold level.

4. The device of claim 1 wherein the sensor comprises a transducer configured to determine a rate at which the cup is being filled.

5. The device of claim 1 wherein the sensor comprises a transducer configured to determine a rate at which the cup is being emptied.

6. The device of claim 1 wherein the at least one feedback comprises at least one of a visual alert, an auditory alert, and a tactile alert.

7. The device of claim 1 wherein the at least one feedback is sent to a remote mobile device, a home monitoring device, a smart speaker, or a smart wearable device.

* * * * *